(12) United States Patent
Azuma et al.

(10) Patent No.: US 7,923,864 B2
(45) Date of Patent: Apr. 12, 2011

(54) POWER FEED SYSTEM, TERMINAL DEVICE, POWER FEEDING METHOD AND COMPUTER READABLE MEDIUM

(75) Inventors: Kouichi Azuma, Kanagawa (JP); Taketoshi Yamaguchi, Kanagawa (JP); Yukio Yamazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 448 days.

(21) Appl. No.: 11/976,027

(22) Filed: Oct. 19, 2007

(65) Prior Publication Data

US 2008/0191558 A1 Aug. 14, 2008

(30) Foreign Application Priority Data

Feb. 13, 2007 (JP) ................................. 2007-031690

(51) Int. Cl.
*H02J 3/00* (2006.01)

(52) U.S. Cl. ........................................................ 307/80
(58) Field of Classification Search ...................... 307/80
See application file for complete search history.

(56) References Cited

U.S. PATENT DOCUMENTS 6,473,608 B1 * 10/2002 Lehr et al. ...................... 455/402
6,643,566 B1 * 11/2003 Lehr et al. ...................... 700/286

FOREIGN PATENT DOCUMENTS

JP A-2002-142385 5/2002

* cited by examiner

*Primary Examiner* — Jared J Fureman
*Assistant Examiner* — Dru M Parries
(74) *Attorney, Agent, or Firm* — Oliff & Berridge, PLC

(57) ABSTRACT

A power feed system includes: an information device; a terminal device that is connected the information processing device, and that has a power source; and a selection unit that selects, as power utilized by the terminal device, at least one of first power from the power source of the terminal device and second power supplied from the information processing device according to an operating state of the terminal device.

15 Claims, 12 Drawing Sheets

US 7,923,864 B2

POWER FEED SYSTEM, TERMINAL DEVICE, POWER FEEDING METHOD AND COMPUTER READABLE MEDIUM

CROSS-REFERENCE TO RELATED APPLICATIONS

This application is based on and claims priority under 35 U.S.C. 119 from Japanese Patent Application No. 2007-031690 filed Feb. 13, 2007.

BACKGROUND

1. Technical Field

The present invention relates to a power feed system, a terminal device, a power feeding method and a computer readable medium.

2. Related Art

Techniques capable of implementing stable operation of an overall system by means of managing the amount of power consumed by equipment connected to a network have hitherto been proposed.

SUMMARY

According to an aspect of the present invention, a power feed system including: an information device; a terminal device that is connected the information processing device, and that has a power source; and a selection unit that selects, as power utilized by the terminal device, at least one of first power from the power source of the terminal device and second power supplied from the information processing device according to an operating state of the terminal device.

BRIEF DESCRIPTION OF THE DRAWINGS

Exemplary embodiment of the present invention will be described in detail based on the following figures, wherein.

DETAILED DESCRIPTION

Embodiments of the present invention will be described hereunder in detail by reference to the accompanying drawings.

Figure 1:
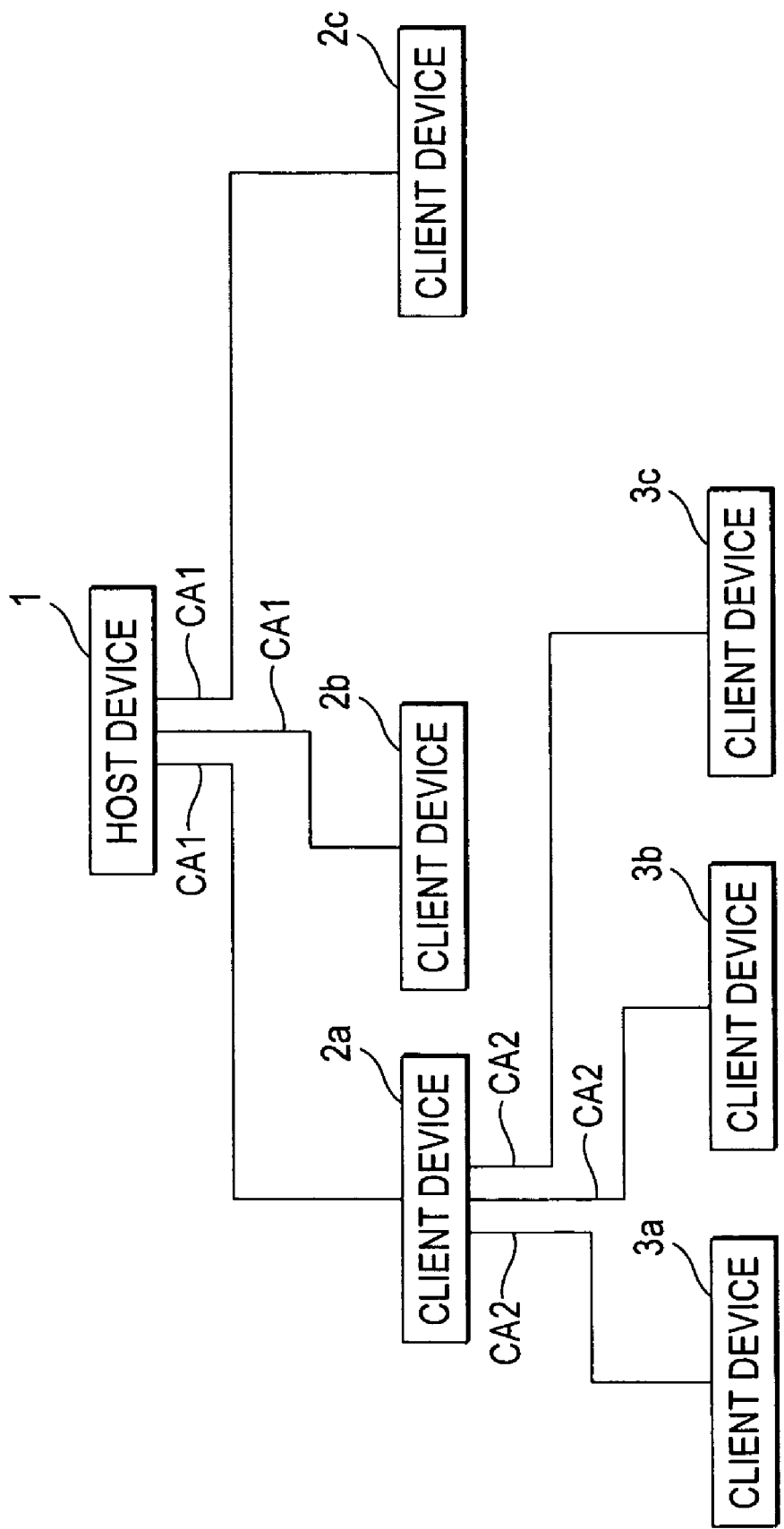
FIG. 1 is a general block diagram of a power feed system according to an embodiment of the present invention.

FIG. 1 is a schematic diagram of a power supply system of an embodiment.

As shown in FIG. 1, a host device 1 (an information processing apparatus or a server) 1 is connected to client devices (high-level client devices, computers, or terminal devices) 2a, 2b, and 2c by way of a cable CA1. The client device 2a is connected to client devices (low-level client devices) 3a, 3b, and 3c by way of a cable CA2. Thus, a network system of tree structure is adopted in the present embodiment. This network system can be installed in; for example, an office.

Now, forming the host device 1 from; for example, a computer, a switching hub capable of supplying electric power to a communications line, or the like is conceivable. Moreover, forming the client devices 2a to 2c and 3a to 3c from office equipment is conceivable. Specifically, for example, the client devices are; for example, an image forming apparatus, a printer, a personal computer, or the like. Alternatively, there are conceivable cases where the client devices are various home electrical products connected to a network, or the like. The present embodiment is described while the host device 1 and the client devices 2a to 2c and 3a to 3c are clearly distinguished from each other. However, there are conceivable cases where the host device 1 doubles as the client devices 2a to 2c and 3a to 3c.

Further, a pair consisting of a data communications line (a communications line) and a power supply line (a power line) can be adopted as the cables (net cables) CA1 and CA2. In such a case, data are exchanged between the host device 1 and the client devices 2a to 2c by means of a data communications line of the cable CA1, and data are exchanged between the client device 2a and the client devices 3a to 3c by means of a data communications line of the cable CA2. Through a power supply line of the cable CA1, the host device 1 can supply (feed) power to the client devices 2a to 2c, and the client device 2a can supply power to the client devices 3a to 3c by way of a power supply line of the cable CA2. Thus, the devices can be connected to each other through the cables CA1 and CA2 capable of transmitting/receiving data and supplying power. Put another way, the host device 1 and the client devices 2a to 2c and 3a to 3c can be configured so as to be connected to a power feed network while maintaining an ordinal relationship.

Through the power supply lines of the cables CA1 and CA2, a maximum of 12.95 W can be supplied at an input voltage of: for example, 36 to 57 V. Therefore, so long as a client device is low-power equipment, the device can operate without preparing for power supply on its own. Additionally, the image forming apparatus serving as the client devices 2a to 2c of the embodiment is provided with an AC power supply (see FIG. 2) as a drive power source as well as with the power supply lines of the cables CA1 and CA2. Adopting standard specifications, such as IEEE 802.3af, for supplying power to or exchanging data among the client devices 2a to 2c and 3a to 3c by way of a power feed network, such as a Power Over Ethernet [(Registered Trademark) which is hereinafter called sometimes PoE], is also conceivable as such a power supply.

First Embodiment

Figure 2:
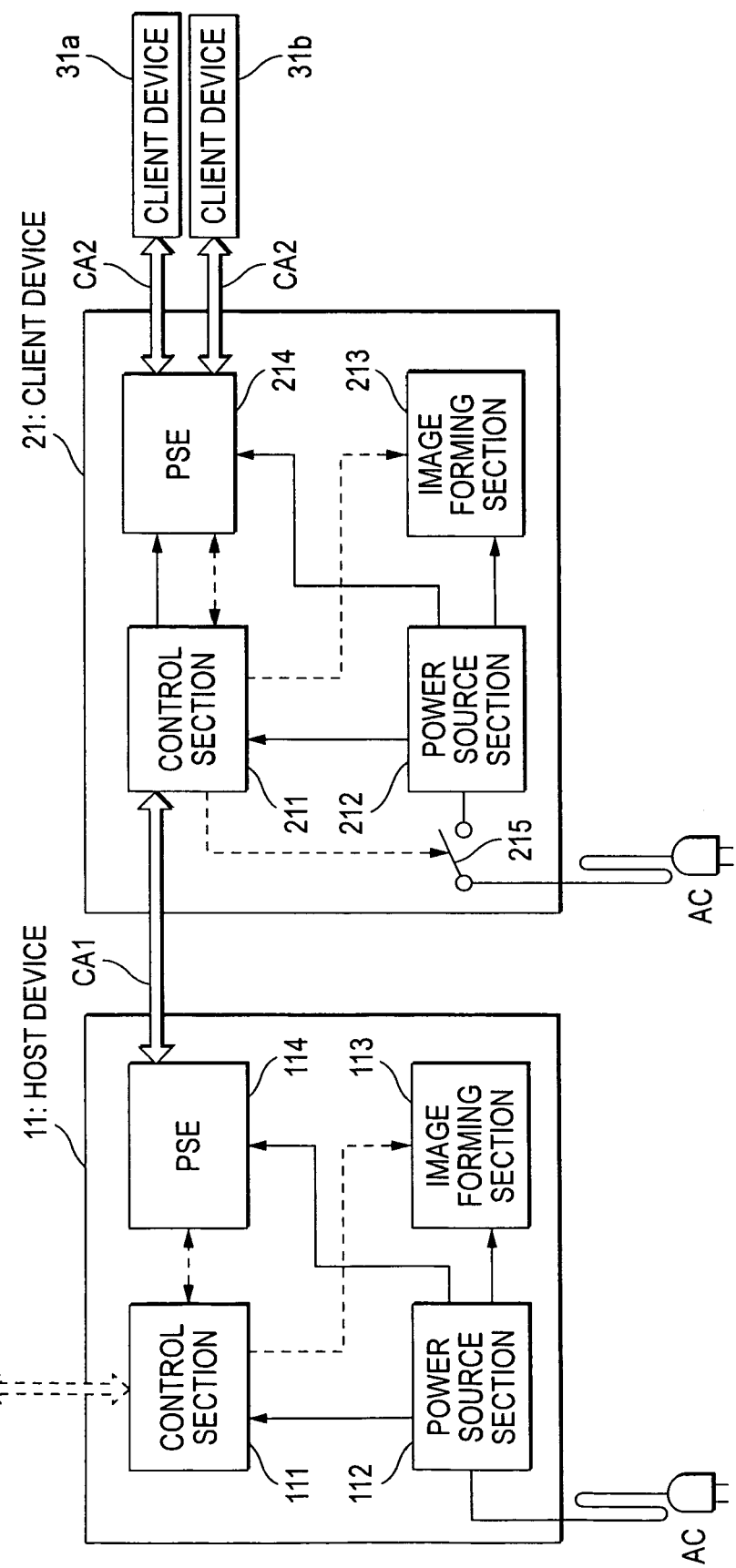
FIG. 2 is a block diagram for describing the configuration of a host device and the configuration of client devices according to a first embodiment of the present invention.

FIG. 2 is a block diagram for describing the configuration of the host device (a second device) 11 and the configuration of a client device 21 according to a first embodiment. The host device of the present embodiment is higher in order than the client device 21, and the host device 11 and the client device 21 are image forming apparatus typified by a printer, or the like. The client device 21 is connected to client devices (first devices) 31a and 31b.

As shown in FIG. 2, the host device 11 has a control section (selection section) 111, a power source section 112, an image forming section 113, and PSE (Power Source Equipment) 114 which is a power feeder of Power Over Ethernet®. The control section 111, the power source section 112, and the PSE 114 constitute power feed means or a power feed section.

The control section 111 is connected through a LAN and a Ethernet®. The control section 111 is connected so as to be able to transmit an operation command, or the like, to the image forming section 113. In addition, an arrowed double broken line connecting the control section 111 to the LAN in FIG. 2 denotes the Ethernet®. An arrowed broken line connecting the control section 111 to the PSE 114 designates a bidirectional communications line. An arrowed broken line extending from the control section 111 to the image forming section 113 designates a data communications line.

The control section 111 manages communication with the LAN, or the like, and controls the operation of the image forming section 113. For instance, when received a print request from unillustrated external equipment connected to the LAN, the control section 111 issues a print command to the image forming apparatus 113 by way of the data communications line.

The power source section 112 feeds the power supplied from the AC power source to the control section 111, the image forming section 113, and the PSE 114. In addition, the power source section 112 supplies power to loads a motor required for image forming operation of the image forming section 113, solenoids, sensors, and a heater used in a fixing unit (none of them are illustrated). In FIG. 2, a solid arrowed line extending from the power source section 112 to the control section 111, the image forming section 113, and the PSE 114, respectively, designates a power supply channel.

In accordance with a print command from the control section 111, the image forming section 113 outputs image data, as an image, on a recording medium such as paper. The PSE 114 establishes data communication with or supplies power to the client device 21 that is descendant equipment. In more detail, the PSE 114 can establish data communication with or supply power to client devices 31a and 31b by way of a PSE 214. When the cable CA1 is connected to the client device 21, the PSE 114 acquires information about the maximum power consumption of the client device 21.

The client device 21 that is lower in order than the host device 11 has a control section 211, a power source section 212, an image forming section 213, the PSE 214, and a switch (relay) 215. The control section 211 controls operations of individual sections of the client device 21, and the like.

The power source section 212 corresponds to the power source section 112 of the host device 11, and the image forming section 213 corresponds to the image forming section 113 of the host device 11. The PSE 214 corresponds to the PSE 114 of the host device 11. Specifically, the power source section 212 feeds power supplied from the AC power source to the control section 211, the image forming section 213, and the PSE 214. The image forming section 213 outputs image data as an image on a recording medium, such as paper, in accordance with a print command from the control section 211. Further, the PSE 214 establishes data communication with and supplies power to the client devices 31a and 31b which are descendant equipment.

The PSE 214 is connected to the client devices 31a and 31b through the cable CA2. The cable CA2 illustrated by an arrowed slid double line is of Power Over Ethernet®. Therefore, the client devices 31a and 31b can be supplied with power from the client device 21.

The control section 211 is connected to the PSE 114 of the host device 11 through the cable CA1. The cable CA1 illustrated by the arrowed solid double line is of Power Over Ethernet®. Therefore, the control section 211 can be supplied with power from the host device 11.

The switch 215 is interposed between the AC power source and the power source section 212. Specifically, the switch 215 is situated on the input side of the power source section 212. Turning-on and turning-off of the switch 215 are controlled by the control section 211. When the switch 215 is turned on by the control section 211, electric power is supplied from the AC power source to the power source section 212, and power is fed to the control section 211, the image forming section 213, and the PSE 214. When the switch 215 is turned off, power supply from the AC power source to the power source section 212 is shut off. When the image forming section 213 is kept in an inoperative state, the control section 211 deactivates the switch 215, thereby reducing power consumed in a standby state.

Even when the switch 215 is switched to the OFF position, the control section 211 can be supplied with power from the high-order host device 1 by way of the cable CA1. In addition, even when the switch 215 is in the OFF position, the control section 211 can supply the PSE 214 with electric power to be supplied to descendant client devices 31a and 31b. Put another way, even when the switch 215 is in the OFF position, the client devices 31a and 31b can be supplied with power from the high-order client device 21 by way of the cable CA2.

Figure 3:
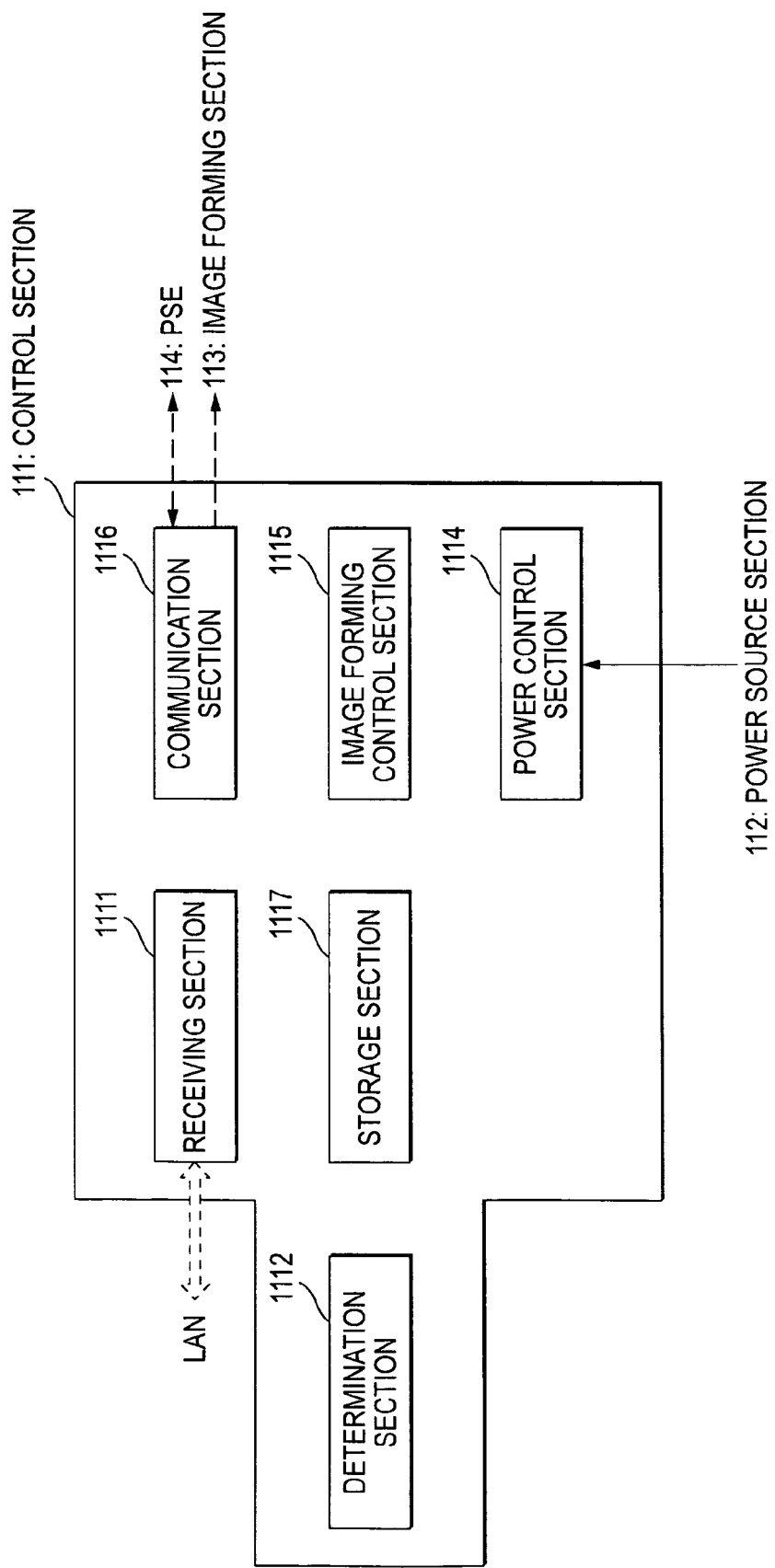
FIG. 3 is a block diagram for describing the configuration of a control section of the host device.

FIG. 3 is a block diagram for describing the configuration of the control section 111 of the host device 11. The control section 111 is formed from; for example, a CPU, memory, and the like. The control section 111 is supplied with power from the power source section 112 even in a low-power consumption mode; that is, a so-called sleep mode, and manages communication with the LAN, or the like, and controls operation of the image forming section 113.

As shown in FIG. 3, the control section 111 has a receiving section 1111, a determination section 1112, a power control section 1114, an image forming control section 1115, a communication section 1116, and a storage section 1117.

The receiving section 1111 exchanges information with an external device which is connected to the LAN through a cable. The determination section 1112 makes a predetermined determination in accordance with the information acquired from the receiving section 1111 and the communications section 1116; issues a command as necessary; and causes the storage section 1117 to store the command. In accordance with the command from the determination section 1112, the power control section 1114 controls a determination as to whether or not to supply power from the power source section 112 to the client device 21.

In accordance with the command from the determination section 1112, the image forming control section 1115 controls the image forming section 113 and the PSE 114 by way of the communication section 1116. The communication section 1116 exchanges information with the image forming section 113 and transmits acquired information to the image forming control section 1115 and the determination section 1112 as needed. In accordance with the command from the determination section 1112, the storage section 1117 stores information, or the like, reads stored information, and transmits the thus-read information to the determination section 1112.

Figure 4:
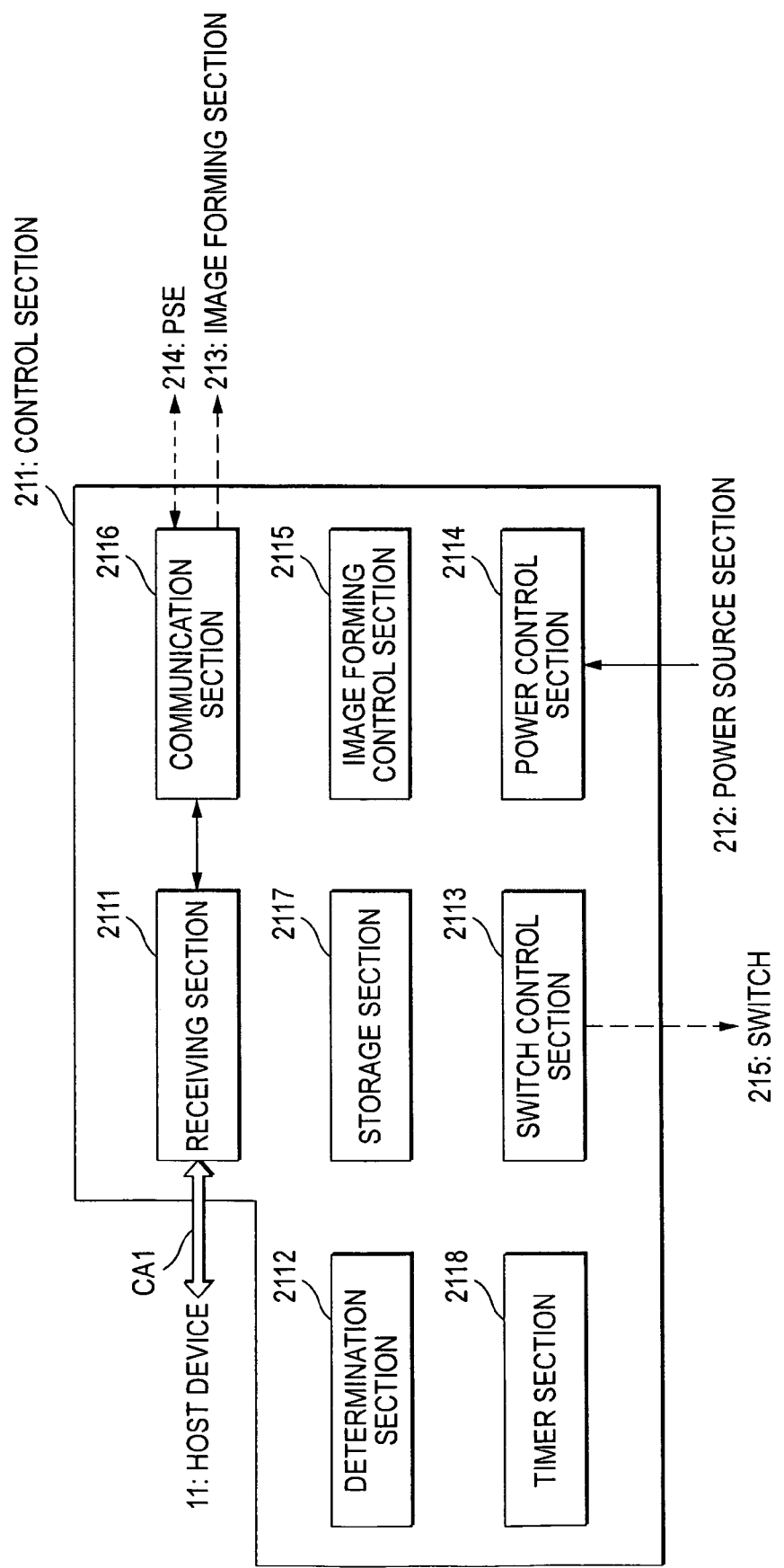
FIG. 4 is a block diagram for describing the configuration of a control section of the client device.

FIG. 4 is a block diagram for describing the configuration of the control section 211 of the client device 21.

As shown in FIG. 4, the control section 211 has a receiving section 2111, a determination section 2112, a switch control section 2113, a power control section 2114, an image forming control section 2115, a communication section 2116, a storage section 2117, and a timer section 2118.

Upon receipt of power supply from the host device 1 by way of the cable CA1, the receiving section 2111 exchanges information with the host device 1. In accordance with the information acquired by the receiving section 2111 and the communication section 2116, the determination section 2112 makes a predetermined determination. When necessary, the determination section 2112 issues a command or causes the storage section 2117 to store the command. In accordance with the command from the determination section 2112, the switch control section 2113 controls activation and deactivation of the switch 215 (see FIG. 2).

In accordance with a command from the determination section 2112, the power control section 2114 controls a determination as to whether or not to feed power to the client device 21. In addition, when feeding power to the client device 21, the power control section 2114 controls a determination as to whether or not to feed power from the host device 11 by way of the cable CA1 or feed power from the power source section 212 and power from the host device 11.

In accordance with the command from the determination section 212, the image forming control section 2115 controls the image forming section 213 and the PSE 214 by way of the communication section 2116. The communication section 2116 exchanges information with the image forming section 213, and transmits the acquired information to the image forming control section 2115 and the determination section 2112 as necessary. In accordance with the command from the determination section 2112, the storage section 2117 stores acquired information, or the like, and reads stored information and sends the thus-read information to the determination section 2112. The timer section 2118 is a timer which measures a time having elapsed since a start command was received and which outputs a measured elapsed time in response to a request from the determination section 2112.

Figure 5:
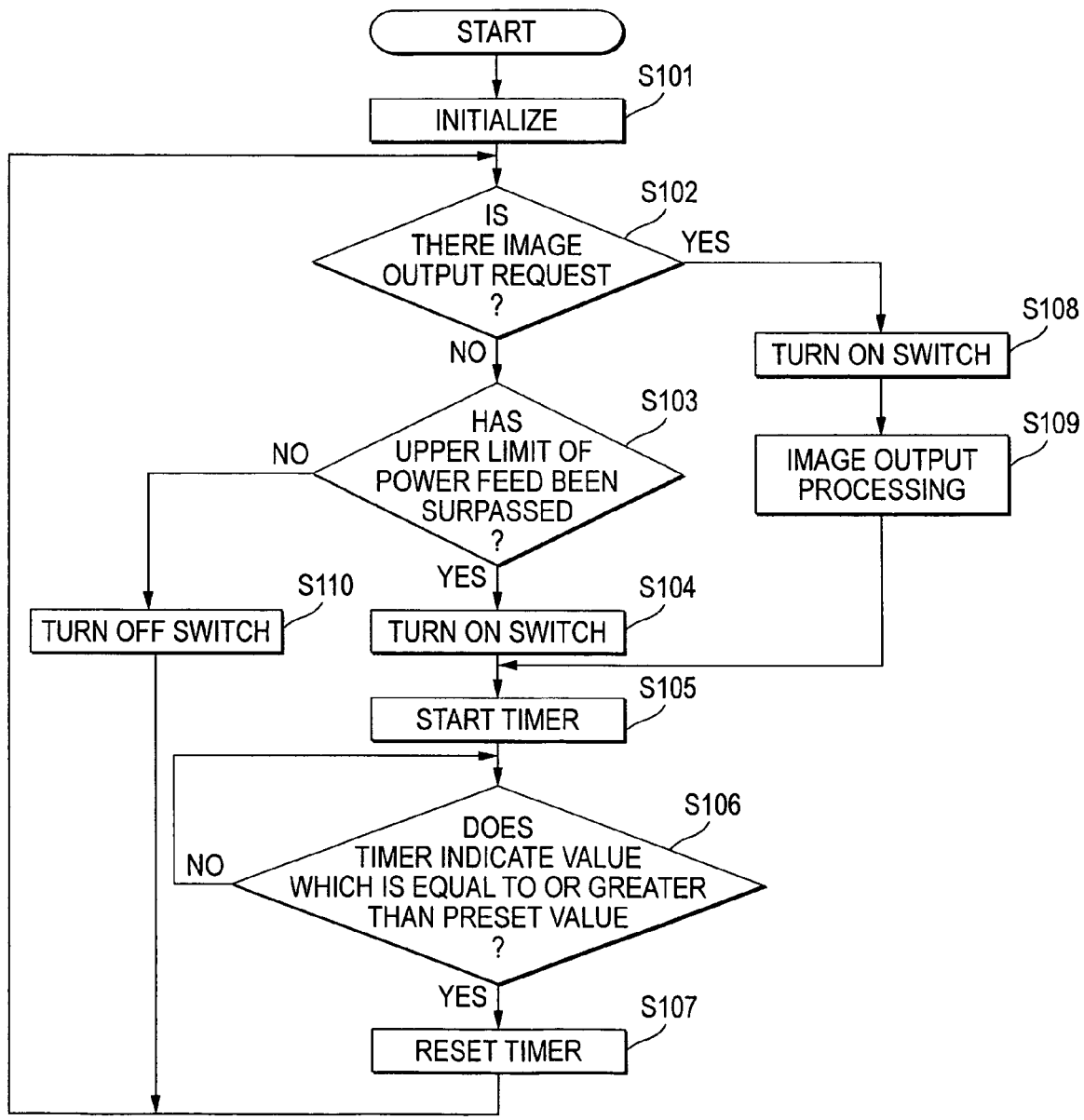
FIG. 5 is a flowchart for describing processing procedures of the power feed system.

FIG. 5 is a flowchart for describing processing procedures of the power feed system of the present embodiment.

As shown in FIG. 5, when main power is turned on, initialization is first performed (step 101). Specifically, when supplied with power, the control section 211 performs initialization. At this point in time, the switch 215 of the control section 211 is held in the OFF position under control of the switch control section 2113. Further, the receiving section 2111 is supplied with a supply of power (an electric current) of the power source section 112 from the PSE 114 of the host device 11 by way of the cable CA1. Supplied power is fed to the client devices 31a and 31b from the communications 2116 and the PSE 214 by way of the cable CA2. Meanwhile, the power source section 212 is held in the OFF position under control of the power control section 2114.

Subsequently, the control section 211 determines whether or not an image output request is issued (step 102). In addition, the image output request issued to the client device 21 from the outside by way of the LAN is transmitted to the control section 211 of the client device 21 by way of the host device 11 and the cable CA1 and received by the receiving section 2111 of the control section 211. The image output request received by the receiving section 2111 is sent to the determination section 2112.

When determined that there is no image output request, the determination section 2112 of the control section 211 determines whether or not the power supplied by way of the cable CA1 has exceeded a predetermined upper level (step 103). When the client devices 31a and 31b remain in a standby condition, power consumption is small. However, the client devices have shifted to an operating status, power consumption increases. When determined that supplied power has exceeded the upper limit, the determination section 2112 commands the switch control section 2113 to switch the switch 215 from the OFF position to the ON position. The switch control section 2113 received the command controls the switch 215 so as to enter an ON status (step 104). As a result, power from the power source section 212 is supplied to the control section 211, the image forming section 213, and the PSE 214. Power supplied to the PSE 214 is supplied to the client devices 31a and 31b. Thus, the client device 21 ensures the amount of power feed to the client devices 31a and 31b. In more detail, in accordance with a command from the power control section 2114 of the control section 211, the PSE 214 selects either power supplied from the host device 11 by way of the cable CA1 or power supplied from the power source section 212 or both of the supplies of power, and feeds power to the client devices 31a and 31b.

After having sent the command to the switch control section 2113, the determination section 2112 commands the timer section 2118 to start measurement of an elapsed time. Specifically, the timer section 2118 starts operation of the timer (step 105). The determination section 2112 determines whether or not the timer indicates a preset value or more (step 106). Specifically, the determination section 2112 determines how much time has passed since the timer started measurement.

When determined that the timer indicates the preset time or more, the determination section 2112 issues a timer reset command to the timer section 2118 (step 107), and processing returns to step 102. The timer section 2118 received the command from the determination section 2112 resets the timer.

When in step 102 determined that there is the image output request, the determination section 2112 commands the switch control section 2113 to switch the switch 215 from the ON position to the OFF position, and the switch control section 2113 turns on the switch 215 (step 108). As a result, power of the power source section 212 is supplied to the control section 211, the image forming section 213, and the PSE 214. The image forming control section 2115 starts control of the image forming section 213 supplied with power feed. After having performed image output processing (step 109), the image forming section 213 proceeds to previously-described step 105.

The image data for which the image output request has been issued are temporarily stored in the storage section 2117, as needed.

When in step 103 determined that supplied power does not exceed the upper limit, the determination section 2112 commands the switch control section 2113 to turn off the switch 215. The switch control section 2113 received the command performs control operation to bring the switch 215 into the OFF position when the switch 215 remains in an ON status (step 110), and processing subsequently returns to step 102.

As mentioned above, when the client devices 31a and 31b connected to the client device 21 remain in a standby condition and when power is small, power supply from the host device 11 has previously been selected. When an increase has arisen in power as a result of operation of the client devices 31a and 31b and when power has exceeded the upper limit of power supply from the host device 11, the control section 211 immediately turns on the switch 215 to start up the power source section 212, thereby using power supply from the power source section 212 in combination or making a switch to power supply solely from the power source section 212. The timer section 2118 holds the switch 215 in the ON position for a predetermined period of time. When determined that power can be made up of by the power supply from the host device 11 as a result of a decrease in power consumption, the determination section 2112 turns off the switch 215, thereby performing control operation so as to reduce a power loss.

Second Embodiment

Figure 6:
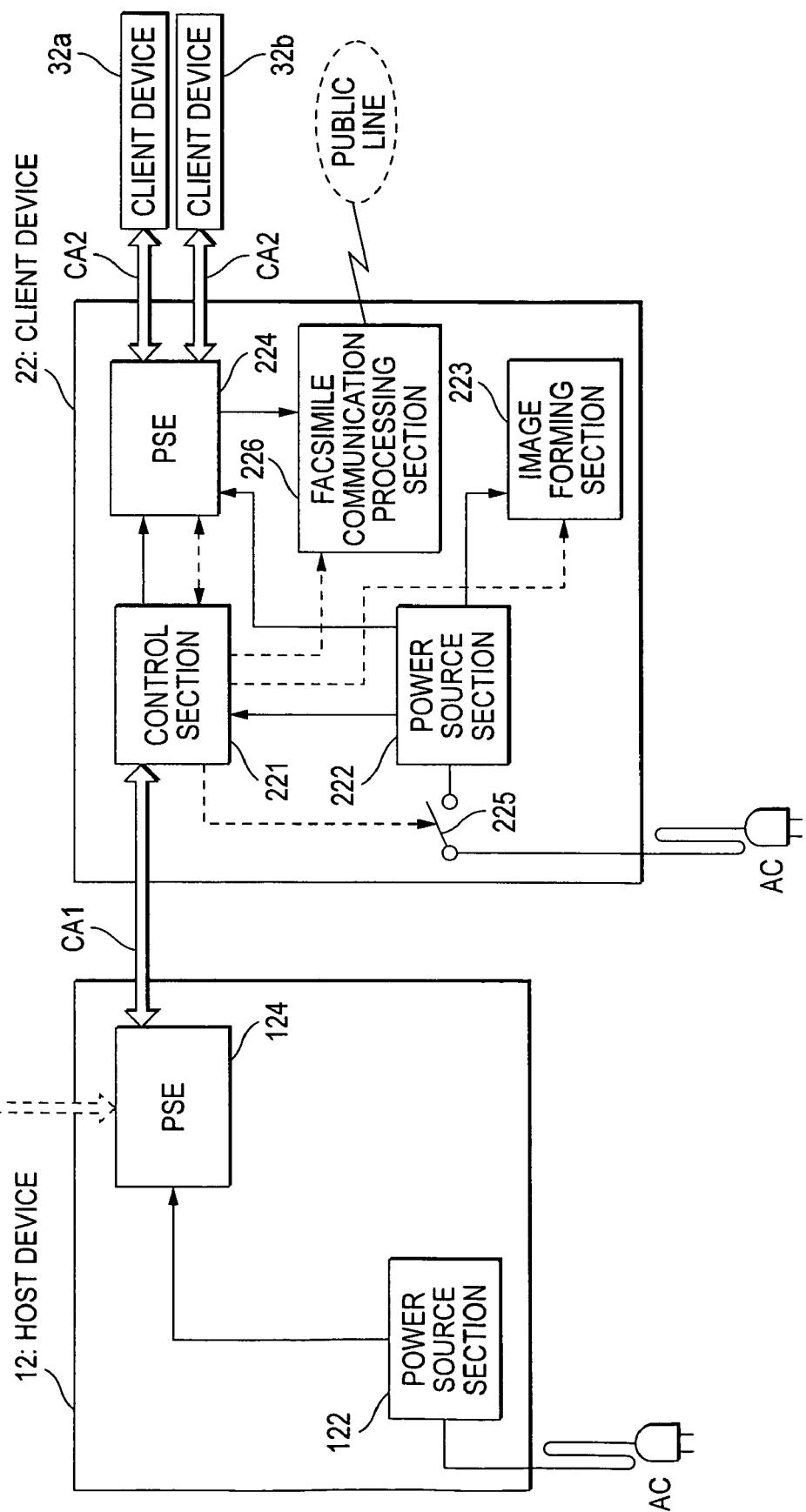
FIG. 6 is a block diagram for describing the configuration of a host device and the configuration of client devices according to a second embodiment of the present invention.

FIG. 6 is a block diagram for describing the configuration of a host device 12 and the configuration of a client device 22 according to a second embodiment of the present invention.

As shown in FIG. 6, the host device 12 has a power source section 122 and a PSE 124. Specifically, the host device 12 can be said to be a hub. The power source section 122 feeds power supplied from an AC power source to the PSE 124. The PSE 124 establishes data communication with and supplies power to the client device 22 that is descendant equipment. In more detail, the PSE 124 establishes data communication with and supplies power to the client devices 32a and 32b by way of a control section 221 and a PSE 224, which will be described later.

The client device 22 has the control section 221, a power source section 222, an image forming section 223, the PSE 224, a switch (relay) 225, and a facsimile communication processing section 226. The power source section 222 corresponds to the power source section 122 of the host device 12, and the PSE 224 corresponds to the PSE 124 of the host device 12. Specifically, the power source section 222 feeds power supplied from the AC power source to the control section 221, the image forming section 223, and the PSE 224. The image forming section 223 outputs image data as an image on a recording medium, such as paper, in accordance with a print command from the control section 221.

Further, the PSE 224 establishes data communication with or supplies power to the client devices 32a and 32b, and also supplies power to the facsimile communication processing section 226.

Turning-on and turning-off of the switch 225 are controlled by the control section 221. When the switch 225 is turned on by the control section 221, electric power is supplied from the AC power source to the power source section 222, and power is fed to the control section 221, the image forming section 223, and the PSE 224. When the switch 215 is turned off, power supply from the AC power source to the power source section 222 is shut off.

The facsimile communication processing section 226 is supplied with power by way of the PSE 224. Specifically, the when the switch 225 is in the ON position, the facsimile communication processing section 226 can be supplied with power from the power source section 222. When the switch 225 is off, the facsimile communication processing section 226 can be supplied with power from the host device 12 by way of the cable CA1. The facsimile communication processing section 226 is connected to a public line.

Figure 7:
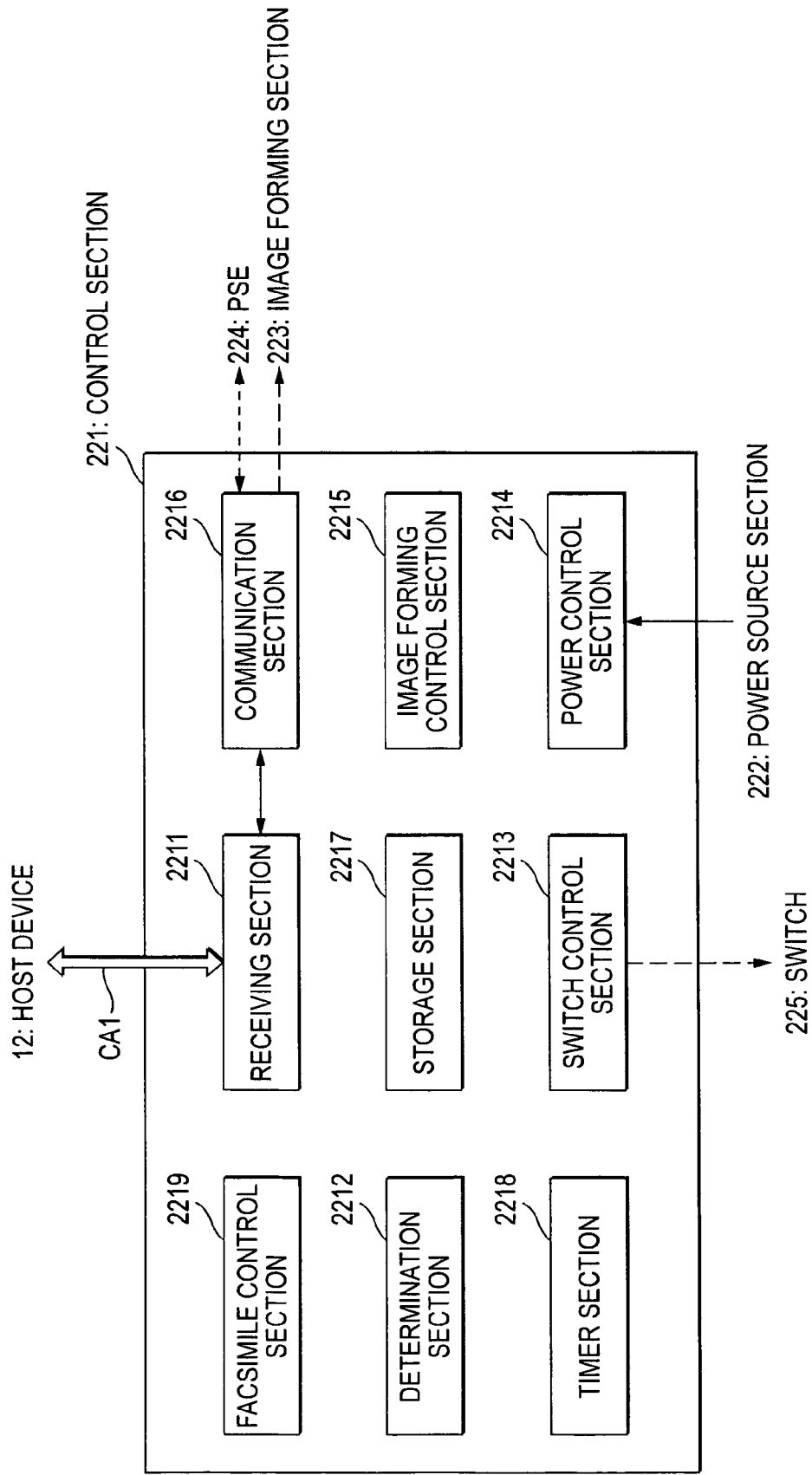
FIG. 7 is a block diagram for describing the configuration of a control section of the client device.

FIG. 7 is a block diagram for describing the configuration of the control section 221 of the client device 22.

As shown in FIG. 7, the control section 221 has a receiving section 2211, a determination section 2212, a switch control section 2213, a power control section 2214, an image forming control section 2215, a communication section 2216, a storage section 2217, a timer section 2218, and a facsimile control section 2219. In contrast with the control section 211 of the first embodiment, the control section 221 has a facsimile control section 2219. This facsimile control section 2219 controls the facsimile communication processing section 226. The receiving section 2211, the determination section 2212, the switch control section 2213, the power control section 2214, the image forming control section 2215, the communication section 2216, the storage section 2217, and the timer section 2218 are analogous to the receiving section 2111, the determination section 2112, the switch control section 2113, the power control section 2114, the image forming control section 2116, the communication section 2116, the storage section 2117, and the timer section 2118 of the control section 211 of the first embodiment, and hence their repeated explanations are omitted.

Figure 8:
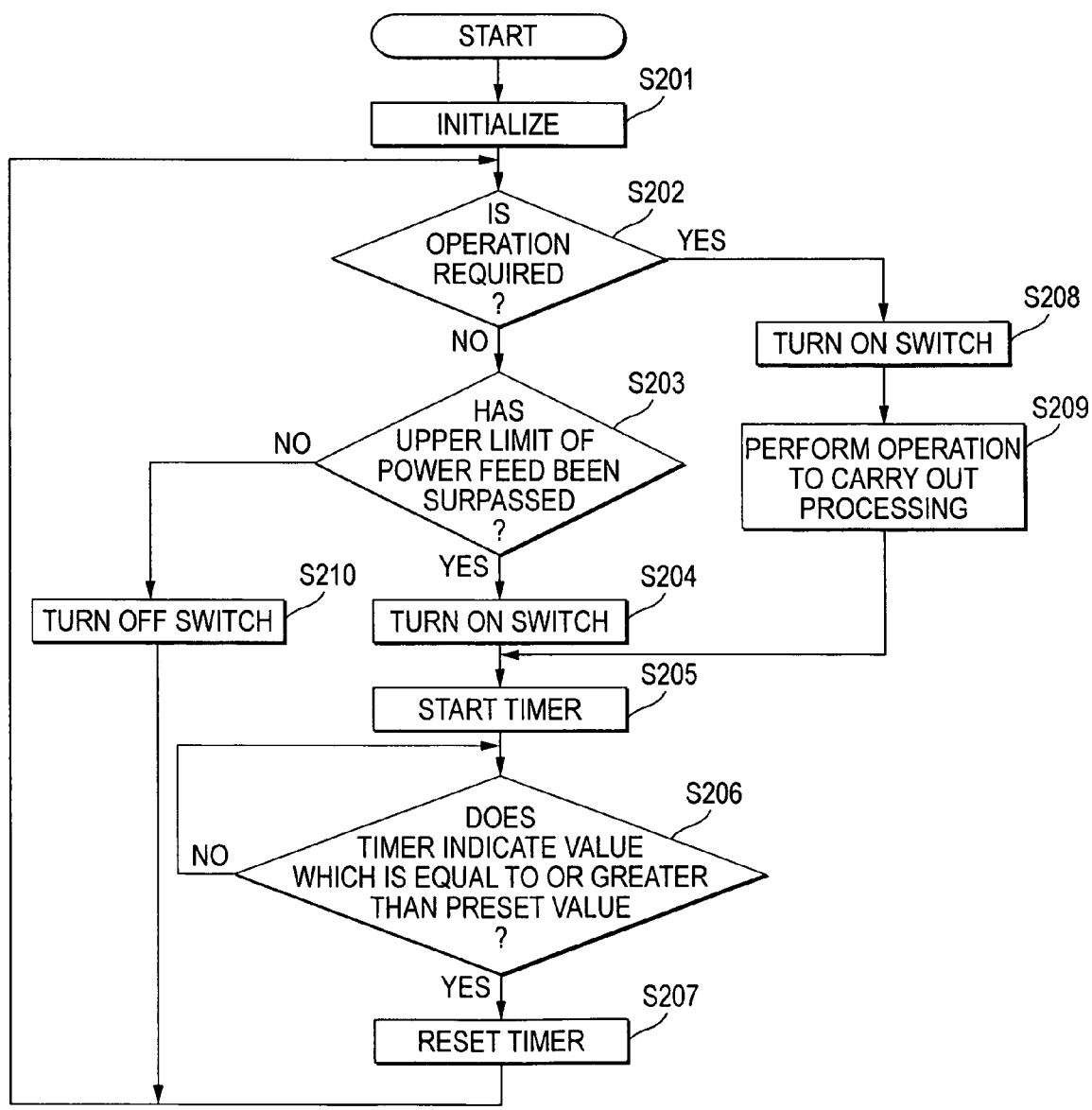
FIG. 8 is a flowchart for describing processing procedures of the power feed system.

FIG. 8 is a flowchart for describing processing procedures of the power feed system of the present embodiment.

As shown in FIG. 8, when main power is turned on, initialization is first performed (step 201). Thereafter, the control section 221 determines whether or not there is a necessity for operation (step 202). For instance, when there is an image output request, a large amount of current must be fed to the image forming section 223. Therefore, the determination section 2212 of the control section 221 determines that there is a necessity for operation. After rendering such a determination, the determination section 2212 commands the switch control section 2213 to turn on the switch 225 (step 208). After necessary operation has been performed (step 209), processing proceeds to step 205 which will be described later.

When determined that there is no necessity for operation, the determination section 2212 of the control section 221 determines whether or not power supplied by way of the cable CA1 has exceeded a predetermined upper limit (step 203). For instance, when the facsimile communication processing section 226 is in a standby condition, power becomes minimized, which does not cause power consumption to surpass a predetermined upper limit. However, in the case of transmission or receipt of data, the amount of power consumption increases. In the meantime, an upper limit is imposed on power supplied from the cable CA1. Accordingly, when determined that power supplied to the facsimile communication processing section 226 and the client devices 32a and 32b surpasses the upper limit on power from the cable CA1, the determination section 2212 commands the switch control section 2213 to switch the switch 225 from the OFF position to the ON position and also commands the timer section 2218 to start a timer. In response to this command, the switch control section 2213 turns on the switch 225 (step 204), and the timer section 2218 starts operating the timer (step 205).

When in step 203 determined that power supplied by way of the cable CA1 does not surpass the predetermined upper limit, the determination section 2212 commands the switch control section 2213 to turn on the switch 225. The switch control section 2213 having received the command performs control operation so as to turn off the switch 225 when the switch 225 is in the ON position (step 210). Subsequently, processing returns to step 202.

When a predetermined set value is achieved after measurement of an elapsed time, the timer section 2218 reports the set value to the determination section 2212. In accordance with the report from the timer section 2218, the determination section 2212 determines whether or not the timer assumes a preset value or more (step 206). Specifically, the determination section 2212 determines whether or not a predetermined time has elapsed since the switch 225 was turned on.

When determined that a predetermined time has elapsed since the switch 225 was turned on, the determination section 2212 commands the timer section 2218 to reset the timer. The timer section 2218 having received the command terminates measurement of an elapsed time, resets the timer (step 207), and processing returns to step 202.

Third Embodiment

Figure 9:
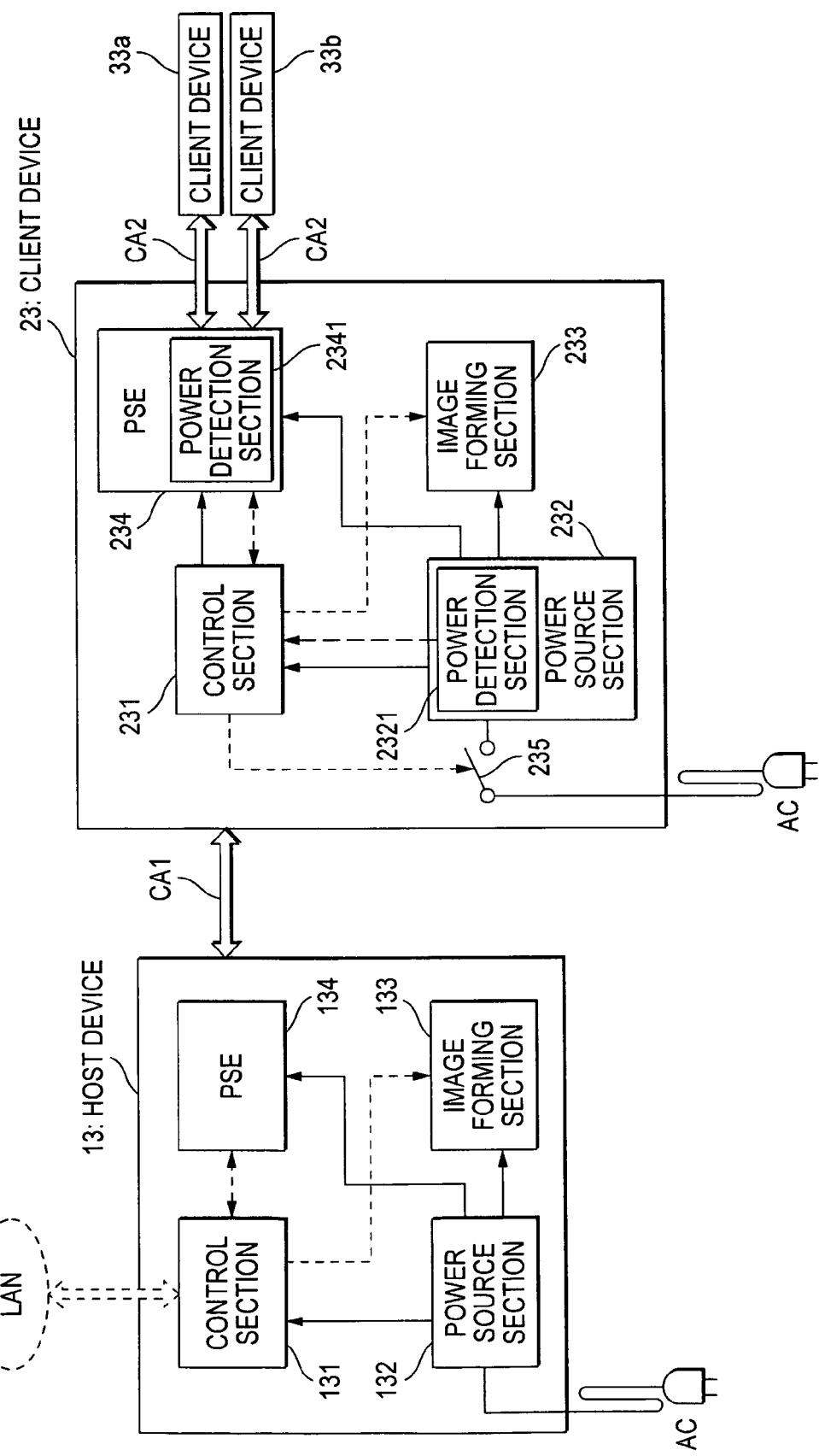
FIG. 9 is a block diagram for describing the configuration of a host device and the configuration of client devices according to a third embodiment of the present invention.

FIG. 9 is a block diagram for describing the configuration of a host device 13 and the configuration of a client device 223 according to a third embodiment.

As shown in FIG. 9, the host device 13 has a control section 131, a power source section 132, an image forming section 133, and PSE 134. The control section 131 is connected through a LAN and a Ethernet®. The control section 131 is connected so as to be able to transmit an operation command, or the like, to the image forming section 133.

The power source section 132 feeds the power supplied from the AC power source to the control section 131, the image forming section 133, and the PSE 134. In accordance with a print command from the control section 131, the image forming section 133 outputs image data, as an image, on a recording medium such as paper. The PSE 134 establishes data communication with or supplies power to the client device 23 that is descendant equipment. The PSE 134 can establish data communication with or supply power to client devices 33a and 33b by way of a control section 231 and a PSE 234 which will be descried later.

The client device 23 has the control section (control means) 231, a power source section 232, an image forming section 233, the PSE 234, and a switch (relay) 235. The control section 231 controls operations of individual sections of the client device 23, and the like.

The power source section 232 feeds power supplied from the AC power source to the control section 231, the image forming section 233, and the PSE 234. The power source section 232 has a power detection section (detection means or a detection section) 2321 for detecting the amount of electric power supplied by the power source section 232 to the control section 231. A result of detection performed by the power detection section 2321 is sent to the control section 231. It is also conceivable that the power detection section 2321 is configured so as to detect an electric current input to the power source section 232 as well as to detect an electric current output from the power source section 232.

The PSE 234 establishes data communication with and supplies power to the client device 23 that is descendant equipment. The PSE 234 also has a power detection section 2341 for detecting the amount of power fed to the client devices 33a and 33b. A result of detection performed by the power detection section 2341 is sent to the control section 231.

The image forming section 233 corresponds to the image forming section 133 of the host device 13.

Figure 10:
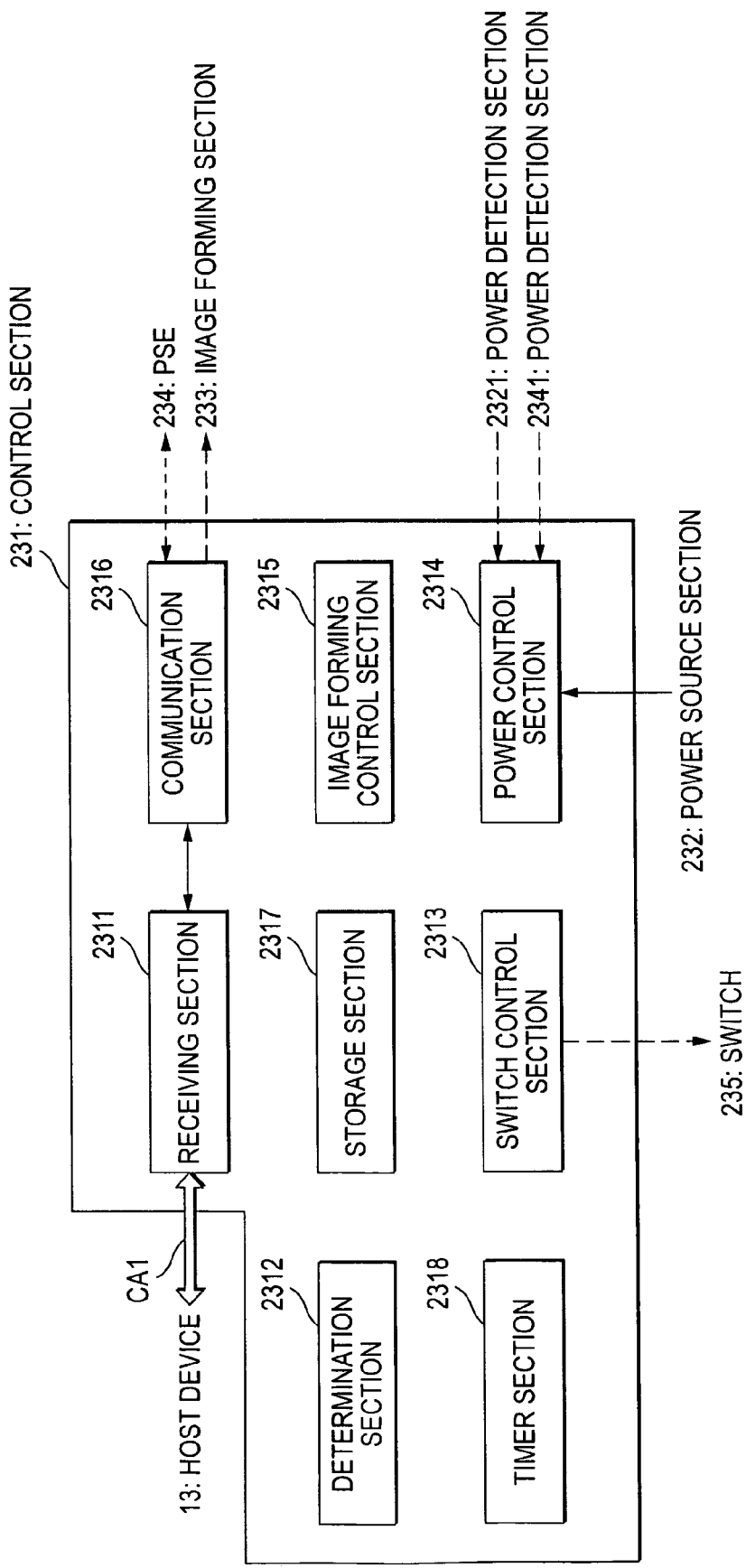
FIG. 10 is a block diagram for describing the configuration of a control section of the client device.

FIG. 10 is a block diagram for describing the configuration of the control section 231 of the client device 23.

As shown in FIG. 10, the control section 231 has a receiving section 2311, a determination section 2312, a switch control section 2313, a power control section 2314, an image forming control section 2315, a communication section 2316, a storage section 2317, and a timer section 2318. The receiving section 2311, the determination section 2312, the switch control section 2313, the power control section 2314, the image forming control section 2315, the communication section 2316, the storage section 2317, and the timer section 2318 are analogous to the receiving section 2111, the determination section 2112, the switch control section 2113, the power control section 2114, the image forming control section 2116, the communication section 2116, the storage section 2117, and the timer section 2118 of the control section 211 of the first embodiment, and hence their repeated explanations are omitted.

A result of detection performed by the power detection section 2321 of the power source section 232 and a result of detection performed by the power detection section 2341 of the PSE 234 are input to the power control section 2314.

Figure 11:
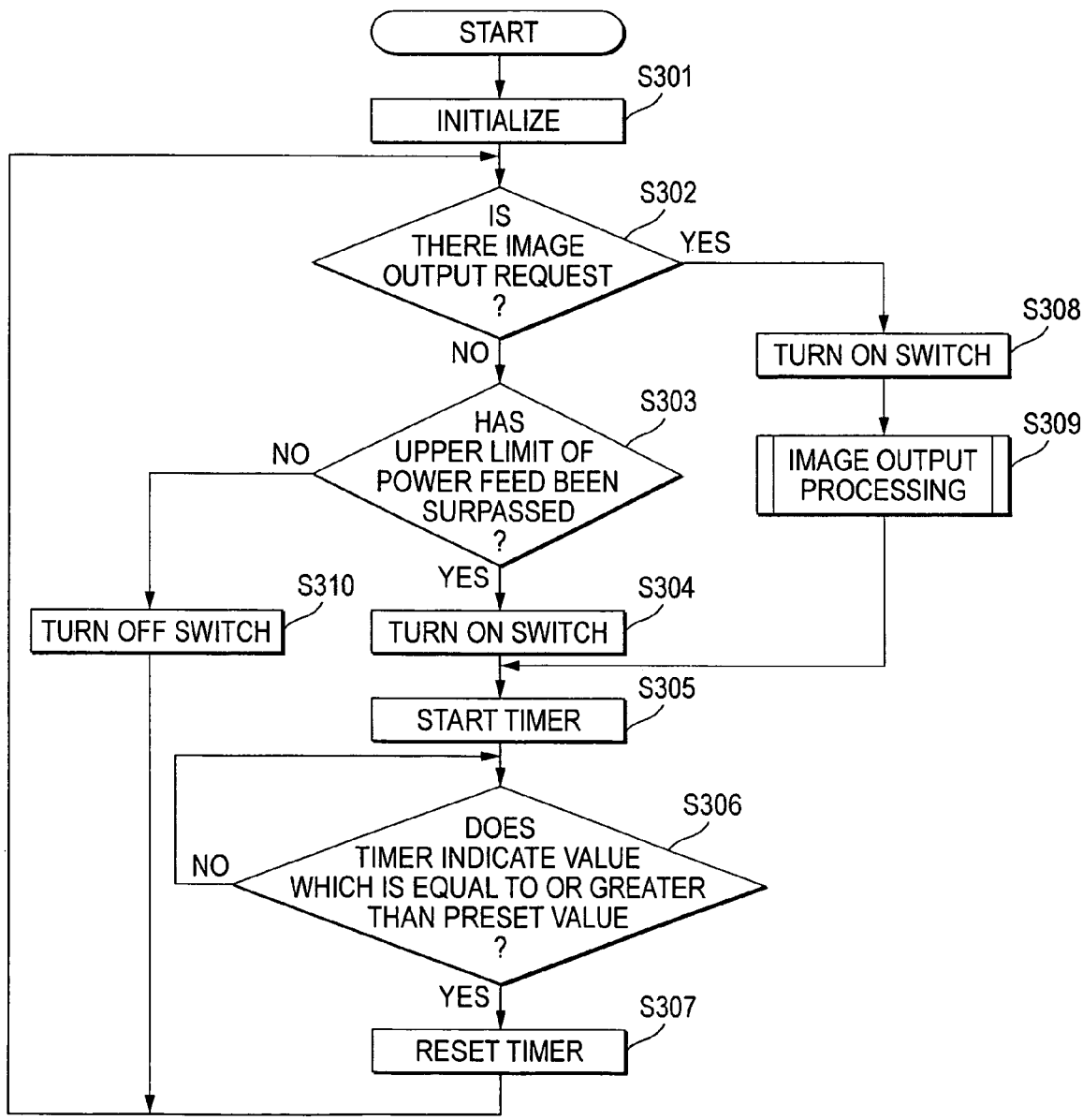
FIG. 11 is a flowchart for describing processing procedures of the power feed system.
Figure 12:
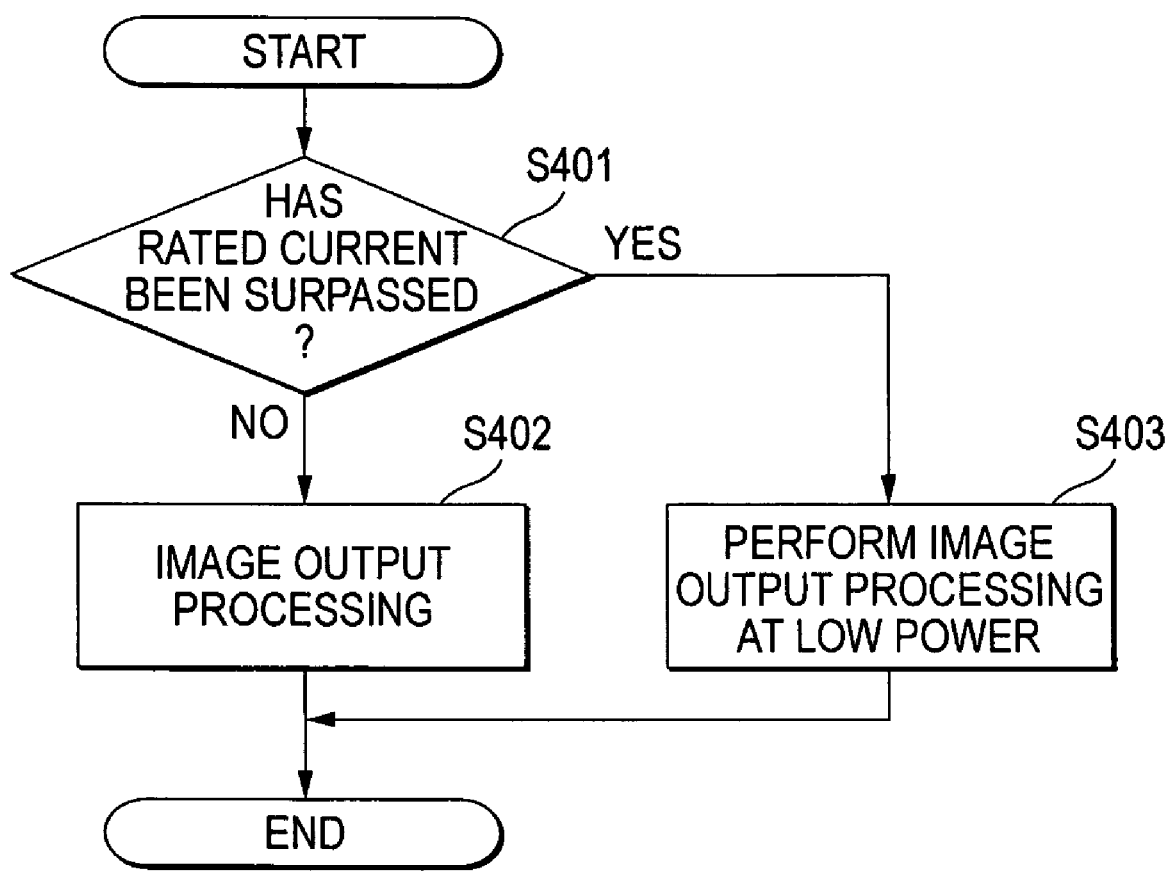
FIG. 12 is a flowchart for describing processing procedures of the power feed system.

FIGS. 11 and 12 are flowcharts for describing processing procedures of the power feed system of the present embodiment.

As shown in FIGS. 11 and 12, when main power is turned on, initialization is first performed (step 301). Thereafter, the determination section 2312 of the control section 231 determines whether or not there is an image output request (step 302). When determined that there is no image output request, the determination section 2312 determines whether or not power supplied by way of the cable CA1 has surpassed a predetermined upper limit (step 303). When determined that power has surpassed the upper limit, the determination section 2312 commands the switch control section 2313 to turn on the switch 235, commanding the timer section 2318 to start operating the timer. As a result, the switch control section 2313 turns on the switch 235 (step 304), and the timer section 2318 starts operation of the timer (step 305).

Subsequently, the determination section 2312 determines whether or not the timer of the timer section 2318 indicates a value which is equal to or greater than a preset value (step 306). When the timer is determined to indicate a value which is equal to or greater than the present value, the determination section 2312 commands the timer section 2318 to reset the timer (step 307), and processing returns to step 302. In the meantime, when the timer has indicated a value which is not equal to or greater than the preset value, processing returns to step 306.

When in step 302 determined that there is an image output request, the determination section 2312 commands the switch control section 2313 to turn on the switch 235. The switch control section 2313 having received the command turns on the switch 235 (step 308) and subsequently performs image output processing (step 309), and processing proceeds to step 305.

When in step 303 determined that the upper limit is not surpassed, the determination section 2312 commands the switch control section 2313 to turn off the switch 235. The switch control section 2313 received the command performs control operation so as to turn off the switch 235 when the switch 235 is in the ON position (step 310), and subsequently processing returns to step 302.

Specific processing procedures pertaining to step 309 will be described by reference to FIG. 12.

As shown in FIG. 12, in image output processing, the determination section 2312 first determines whether or not an output from the power source section 232 surpasses a rated current (step 401). Specifically, an electric current (rated current) which can be supplied from an outlet in Japan is usually 100 V/15 A, and the image forming apparatus is designed so as to operate at an electric current which is equal to or lower than the rated current. Therefore, in the present embodiment, the power detection section 2321 monitors the rated current. In accordance with a result of detection, specifics of image output processing are changed.

Specifically, when the determination section 2312 determines that the rate current is not surpassed, normal image output processing is performed (step 402). In contrast, when the determination section 2312 determines that the rated current is surpassed, image output processing is performed at low power (step 403). Specifically, the client device 23 suppresses an electric current used for its image output operation so as not to surpass the rated current while maintaining the amount of power feed to the plurality of client devices 33*a* and 33*b*. For instance, conceivable image output processing at low power is to lower a present temperature of an unillustrated fixing unit or lower a print output speed. Conceivable control operation for achieving a warm-up at startup of equipment is to lower power applied to the unillustrated fixing unit, to thus longer a warm-up time. As a result, the electric current supplied from the power source section 232 does not exceed the rated current even when the image forming section 233 performs image output operation.

It is conceivable that, so long as a controllable level has been set previously for these control operations, the control section 231 can select a control method in conformance to the amount of power consumed before outputting of an image.

In more detail, the power detection section 2341 of the PSE 234 monitors the amount of power feed to the client devices 33*a* and 33*b*. Hence, even when the rated current is determined to have been surpassed in step 401, the determination section 2312 of the control section 231 can detect a decrease in the amount of power feed to the client devices 33*a* and 33*b* as a result of the client devices 33*a* and 33*b* having shifted from an operating status to a standstill status during the course of image output processing. Consequently, it is also conceivable that the determination section 2312 performs control operation so as to shift the client device to ordinary image output processing even in the middle of image output processing being performed at low power.

Various processing operations described in connection with the previous embodiments are embodied by means of an application program which is executed by use of the storage sections 2117, 2217, and 2317 that serve as working memory for the client devices 21, 22, and 23. When the client devices 21, 22, and 23 corresponding to computers are provided to the clients, this application program is considered to be provided while being installed in the devices. In addition to this case, a program to be executed by a computer is provided while remaining stored in a storage medium, or the like, in a computer-readable manner. For instance, a CD-ROM medium, or the like, corresponds to this storage medium, and a program is read and executed by means of a CD-ROM reader (not shown), or the like. These programs are also provided by means of; for example; a program transfer device (not shown), by way of a network and a network interface. This program transfer device has memory which is provided in; e.g., the client devices 21, 22, and 23, and which stores a program and program transfer means for providing the program by way of a network.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A power feed system comprising:
an information processing device;
a terminal device that is connected to the information processing device, and that has a power source;
a selection unit that selects, as power utilized by the terminal device, at least one of first power from the power source of the terminal device and second power supplied from the information processing device according to an operating state of the terminal device; and
a control section, wherein
the control section determines whether or not the second power supplied from the information processing device to the terminal device exceeds a predetermined level, and
if the control section determines that the second power exceeds the predetermined level, the control section causes the selection unit to select at least the first power,
wherein when a predetermined time is exceeded, the power source switches to the second power supplied by the information processing device.

2. The power feed system as claimed in claim 1, further comprising:
a power feed unit that supplies another terminal device connected to the terminal device with either the first power from the power source of the terminal device and the second power supplied from the information processing device, or both of the first and second power.

3. The power feed system as claimed in claim 1, further comprising:
a detection unit that detects an electric current input to or output from the power source of the terminal device; and
a control unit that controls operation of the terminal device, in accordance with a result of detection performed by the detection unit, such that the electric current input to or output from the power source falls within a predetermined range.

4. The power feed system as claimed in claim 1, wherein the information processing device is connected to the terminal device through a communications line and a power line.

5. The power feed system as claimed in claim 1, further comprising:
a detection unit that detects an electric current input to or output from the power source of the terminal device; and
a control unit that stops a supply of power from the power source in a case where a result of detection performed by the detection unit shows that the electric current input to or output from the power source is equal to or less than a predetermined value, and that performs control operation such that the supply of power is switched to a feed from the information processing device.

6. The power feed system as claimed in claim 1, further comprising:
a detection unit that detects an electric current input to or output from the power source of the terminal device, with the detection indicating that power is available.

7. A terminal device comprising:
a power source section;
a selection section that selects, as power to be utilized, third power supplied from another connected device, fourth power from the power source section, or both of the third and fourth power; and
a control section, wherein the control section determines whether or not the third power supplied from said another connected device to the terminal device exceeds a predetermined level, and if the control section determines that the third power exceeds the predetermined level, the control section causes the selection unit to select at least the fourth power, wherein when a predetermined time is exceeded, the power source switches to the third power supplied by the another connected device.

8. The terminal device as claimed in claim 7, further comprising:

a detection section that detects an output from the power source section; and a control section that performs control operation in such a way that power consumed by the terminal device is reduced in a case where a result of detection performed by the detection section shows that power become deficient.

9. The terminal device as claimed in claim 7, further comprising:

a detection section that detects an electric current input to or output from the power source section of the terminal device, with the detection indicating that power is available.

10. A terminal device comprising:

a power source section;

a power feed section that supplies power to a first device to be connected; and a selection section that selects, as power supplied from the power feed section to the first device, fifth power supplied from a second device to be connected, sixth power from the power source section, or both of the fifth and sixth power; and a control section, wherein the control section determines whether or not the fifth power supplied from the second device to the terminal device exceeds a predetermined level, and if the control section determines that the fifth power exceeds the predetermined level, the control section causes the selection unit to select at least the sixth power, wherein when a predetermined time is exceeded, the power source switches to the fifth power supplied by the second device.

11. The terminal device as claimed in claim 10, further comprising:

a detection section that detects an electric current input to or output from the power source section of the terminal device, with the detection indicating that power is available.

12. A power feeding method comprising:

determining whether or not seventh power supplied to a terminal device having a power source section from another terminal device connected to the terminal device through a power line exceeds a predetermined level;

if it is determined that the seventh power exceeds the predetermined level, selecting, as power to be used by the terminal device at least eighth power from the power source section of the terminal device; and switching the power to be used by the terminal device to the seventh power source when a predetermined amount of time is exceeded.

13. The power feeding method as claimed in claim 12, further comprising:

detecting an electric current input to or output from the power source section of the terminal device, with the detection indicating that power is available.

14. A non-transitory computer readable medium storing a program causing a computer, which is provided in a terminal device being connected to another terminal device through a power line and having a power source section, to execute a process for supplying electric power to the terminal device according to a required amount, the process comprising:

determining whether or not ninth power supplied to a terminal device having a power source section from another terminal device connected to the terminal device through a power line exceeds a predetermined level;

selecting, as power to be used by the terminal device, at least tenth power from the power source section of the terminal device; and switching the power to be used by the terminal device to the ninth power source when a predetermined amount of time is exceeded.

15. The non-transitory computer readable medium as claimed in claim 14, further comprising:

detecting an electric current input to or output from the power source section of the terminal device, with the detection indicating that power is available.

* * * * *